US012290805B2

(12) United States Patent
Wilth et al.

(10) Patent No.: US 12,290,805 B2
(45) Date of Patent: May 6, 2025

(54) MULTICHANNEL PIPETTING HEAD

(71) Applicant: Eppendorf AG, Hamburg (DE)

(72) Inventors: Marc Wilth, Hamburg (DE); Holger Link, Hamburg (DE)

(73) Assignee: Eppendorf AG, Hamburg (DE)

( * ) Notice: Subject to any disclaimer, the term of this patent is extended or adjusted under 35 U.S.C. 154(b) by 468 days.

(21) Appl. No.: 17/366,146

(22) Filed: Jul. 2, 2021

(65) Prior Publication Data

US 2022/0001377 A1 Jan. 6, 2022

(30) Foreign Application Priority Data

Jul. 2, 2020 (EP) .................................... 20183723

(51) Int. Cl.
*B01L 3/02* (2006.01)

(52) U.S. Cl.
CPC ........... *B01L 3/0279* (2013.01); *B01L 3/0234* (2013.01)

(58) Field of Classification Search
CPC .... B01L 3/0279; B01L 3/0234; B01L 3/0227; B01L 2200/022; B01L 3/0217; B01L 3/021
USPC ............. 73/863.33, 864.14, 864.17; 422/501
See application file for complete search history.

(56) References Cited

U.S. PATENT DOCUMENTS 5,057,281 A 10/1991 Torti et al.
5,061,449 A 10/1991 Torti et al.
7,947,234 B2 5/2011 O'Connell et al.
8,029,742 B2 10/2011 Butz et al.
2007/0003445 A1 1/2007 Belgardt et al.
2011/0311410 A1* 12/2011 Butz .................... B01L 3/0217 422/509
2017/0028397 A1 2/2017 Dudek

FOREIGN PATENT DOCUMENTS

CN 108816303 A * 11/2018 ................ B01L 3/02
DE 102005030196 B3 2/2007
EP 1875966 A1 1/2008

(Continued)

OTHER PUBLICATIONS

JP 2021-102610, filed Jun. 21, 2021, Notification of Reasons for Refusal, Drafting Date Mar. 14, 2023 (3 pages).

(Continued)

*Primary Examiner* — Robert R Raevis
(74) *Attorney, Agent, or Firm* — Barclay Damon LLP

(57) ABSTRACT

A multichannel pipetting head comprises a plunger actuator comprising at least one groove with an upper border, and a lower border. A plurality of plunger-cylinder units, wherein each plunger-cylinder unit comprises a cylinder and a plunger comprising a plunger head. The plunger head comprises a projecting upper abutment region adjoining the upper border, a projecting lower abutment region adjoining the lower border and laterally offset relative to the projecting upper abutment region, a plurality of guides. Each of the cylinders is coupled to a neck and held on each of the plurality of guides. During lateral movement of the plurality of guides, the plunger head is configured to tilt in the groove and to be held with the upper abutment region abutting the upper border and with the lower abutment region abutting the lower border of the groove due to restoring forces that occur during tilting in the plunger-cylinder units.

12 Claims, 4 Drawing Sheets

(56) References Cited

FOREIGN PATENT DOCUMENTS

| | | | | | |
|---|---|---|---|---|---|
| EP | 2231335 | A1 | | 9/2010 | |
| GB | 2431600 | A | | 5/2007 | |
| JP | H9-049848 | A1 | | 9/1998 | |
| JP | 2004003909 | A | | 1/2004 | |
| JP | 4981209 | B2 | * | 7/2012 | ............ B01L 3/0217 |
| JP | 2013531553 | A | * | 8/2013 | |

OTHER PUBLICATIONS

JP 2021-102610, filed Jun. 21, 2021, English translation of Notification of Reasons for Refusal, Drafting Date Mar. 14, 2023 (6 pages).

* cited by examiner

MULTICHANNEL PIPETTING HEAD

CROSS REFERENCE TO RELATED INVENTION

This application is based upon and claims priority to, under relevant sections of 35 U.S.C. § 119, European Patent Application No. 20 183 723.4, filed Jul. 2, 2020, the entire contents of which are hereby incorporated by reference.

FIELD OF TECHNOLOGY

The invention relates to a multichannel pipetting head comprising multiple necks configured be moved relative to one another for clamping pipette tips.

BACKGROUND

Multichannel pipettes are used particularly in laboratories for simultaneously pipetting multiple liquid samples. The liquid samples are taken up from a row of receptacles in a microtiter plate or from other vessels into pipette tips that are releasably connected to the multichannel pipette and said liquid samples are dispensed from the pipette tips into vessels. Multichannel pipettes comprise multiple necks or shafts onto which the pipette tips can be clamped. One or more displacement apparatuses are provided for aspirating the liquid samples into and discharging the liquid samples from the pipette tips, which displacement apparatuses are capable of moving an air cushion between the liquid samples and the displacement apparatuses. They are mostly designed as plunger-cylinder units comprising a cylinder and a plunger that can slide therein. The displacement apparatuses are connected via channels or lines to openings in the ends of the necks, on which the pipette tips sit. After pipetting, the pipette tips can be pressed off the necks by means of an ejector. For additional pipetting procedures, fresh pipette tips can be clamped onto the necks. As a result, carry-over between various liquid samples and contamination of the liquid samples and multichannel pipette are prevented.

Multichannel pipettes comprise a pipette top part that contains a drive apparatus, is substantially cylindrical and can be gripped using a single hand. They also comprise a multichannel bottom part, also referred to as a multichannel pipetting head, that contains at least one displacement apparatus, comprises necks on the bottom side and is coupled to the drive apparatus by means of a drive rod. The drive apparatus may be a manually operated mechanical drive apparatus or an electromechanical drive apparatus.

Standardized microtiter plates (ANSI SLAS 4-2004 2012) that have 96 receptacles in rows and columns with a distance of 9 mm between the center axes of adjacent receptacles or that have 384 receptacles in rows and columns with a distance of 4.5 mm between the center axes of adjacent receptacles are known, in particular. Multichannel pipettes having necks arranged at fixed positions can only take up liquid samples from and dispense liquid samples into all receptacles of a row or column in one of the two plate types.

EP 1 875 966 A1 describes a multichannel pipetting head in which a vertical plunger actuation rod projects upward from a horizontal cross-member that comprises multiple receptacles arranged one next to the other for plunger heads. Plungers that are arranged by their plunger heads at fixed positions in the receptacles are guided in multiple parallel cylinders. Each plunger head rests on a base of the receptacle via a bottom side facing the plunger rod and comprises a resilient body that protrudes from the top side and that adjoins an abutment surface of the receptacle so as not to be resiliently compressed or so as to be partially resiliently compressed for the purpose of compensating for play.

Multichannel pipettes are also known in which the distances between the necks can be adjusted to different distances between the receptacles. The necks are flexibly connected to the at least one displacement apparatus via tubes in order to compensate for the movement of the necks relative to the stationarily arranged displacement apparatuses. Multichannel pipettes of this kind are described, in particular, in U.S. Pat. No. 5,057,281 B1, U.S. Pat. No. 5,061,449 B1, U.S. Pat. No. 8,029,742 B2, DE 10 2005 030 196 B3 and EP 2 231 335 B1.

In known multichannel pipettes having adjustable distances between the necks, the differing length of the tubing of the individual channels to the central displacement apparatus creates different dead volumes for the channels. This impairs the accuracy and precision of the pipetting procedures.

Proceeding from this, the object of the invention is to provide a multichannel pipetting head in which the distances between the necks or channels can be adjusted and which allow for pipetting with greater accuracy and precision.

BRIEF SUMMARY OF THE INVENTION

An embodiment of a multichannel pipetting head comprises a horizontal plunger actuator including at least one groove with an upper border, a lower border and a side opening. A drive rod projects upward from the plunger actuator and is configured for moving the plunger actuator in a vertical direction. The multichannel pipette may further comprise multiple plunger-cylinder units each having a hollow cylinder and a plunger that engages therein from above, that is sealed off from the cylinder and that engages in the groove through the opening by means of a plunger head at its top end. The multichannel pipette may further comprise multiple guides that can be shifted along a horizontal shaft, wherein one cylinder and one hollow, downwardly projecting neck that is connected to a through-hole in the lower end of the cylinder is held on each guide. Each plunger head comprises a projecting upper abutment region adjoining the upper border on the top side and a projecting lower abutment region adjoining the lower border and laterally offset with respect to the upper abutment region on the bottom side. During a lateral movement of the guide along the horizontal shaft, the plunger head is configured evade clamping forces by tilting in the groove and is held with the upper abutment region in abutment with the upper border and with the lower abutment region in abutment with the lower border of the groove on account of elastic restoring forces that occur during tilting in the plunger-cylinder unit.

In an embodiment of a multichannel pipetting head, each neck is held together with a cylinder of a plunger-cylinder unit on a guide (holder) and the neck can be moved together with the plunger-cylinder unit along the horizontal shaft. This enables small and constant dead volumes between the necks and the respective plunger-cylinder units connected thereto. During movement of the plunger-cylinder units along the shaft, the plunger heads are moved in the groove of the plunger actuator. In an embodiment of the plunger heads and plunger actuator, the plunger heads would have to be arranged with a clearance in the receptacle of the plunger actuator. This would impair the accuracy and precision of the multichannel pipetting head. According to an embodiment, the coupling between the plungers and the plunger actuator enables adjustability without play between the plunger heads and the groove. Specifically, the plunger heads each constantly adjoin the upper border and the lower border of the groove by means of two upper and lower abutment regions that are laterally offset with respect to one another. As a result, the plunger heads can compensate for manufacturing tolerances, in that they are arranged in the groove so as to be slightly tilted or at a slight angle to the horizontal. This causes the plunger heads to tilt slightly during lateral displacement in the groove and, as a result, clamping forces that would hinder displacement of the plunger heads in the groove can be prevented. In the process, the plunger heads are held in abutment with the upper and lower borders of the groove on account of restoring forces that occur during tilting in the plunger-cylinder units. The elastic restoring forces may be caused by deformation of resilient sealing elements and/or by bending of resilient plungers of the plunger-cylinder units. Furthermore, on account of the coupling between the plunger and plunger actuator, tolerances during production of the components can be compensated. Differences in the dimensions of the plunger heads and groove caused by manufacture can namely be compensated by varying degrees of tilting of the plunger heads in the groove. In the process, the plunger heads are always held in abutment with the upper border and lower border of the groove on account of the restoring forces in the plunger-cylinder units. On account of the low and constant dead volume and the clearance-free arrangement of the plunger heads in the groove, a multichannel pipetting head is achieved in which the distances between the necks can be adjusted and which allows for pipetting with greater accuracy and precision.

According to an embodiment, the plunger heads and the groove are configured such that they would form an interference fit (press fit) if the plunger-cylinder unit were a rigid system that is not elastically deformable. As a result, for all dimensions within the tolerance range, the plunger heads are tilted in the groove as a result of elastic deformation in the plunger-cylinder units and held by the upper and lower support regions in abutment with the upper border and lower border. As a result, manufacturing tolerances are comprehensively compensated. During movement in the direction of the shaft, the plunger heads can avoid increased clamping forces by tilting further.

According to another embodiment, each plunger head comprises an upper abutment region in the form of an upper abutment point or upper abutment line on the top side. According to another embodiment, each plunger head comprises a lower abutment region in the form of a lower abutment area or lower abutment line on the bottom side. This enables small, low-friction abutment regions that facilitate tilting of the plunger head.

According to another embodiment, each plunger head comprises an upper abutment point on a spherical cap on the top side and/or a lower abutment area on the lower edge of a downwardly pointing cylinder on the bottom side.

According to another embodiment, the guides are rotatably mounted on the horizontal shaft. As a result, the system is configured to avoid increased clamping forces during movement of the guides along the shaft by pivoting slightly about the shaft.

According to an embodiment, the lower abutment areas are laterally offset further from the horizontal shaft than the upper abutment points. As a result, the guides are configured to pivot until they come into abutment with the plunger actuator on account of the restoring forces that occur during tilting of the plunger heads and the restoring forces hold the plunger heads in abutment with the groove.

According to another embodiment, the groove comprises an upper border opposite the lower border that projects further in the horizontal direction on the side of the opening. The upper border may serve as an abutment for the guide. According to another embodiment, each cylinder comprises resilient hat-leather packing at the top, through which a plunger rod connected to the plunger is guided in an upwardly sealing manner. The resilient hat-leather packing can be used with thin plungers of plunger-cylinder units having a small volume.

According to an embodiment, each plunger comprises a resilient sealing element on the outer circumference that provides a sealing effect on a plunger running surface on the inner side of the cylinder. The resilient sealing element may be molded on or clamped on. According to an embodiment, each neck is supported on the guide via a compression spring such that the neck can be moved upward relative to the guide counter to the compression spring. As a result, multiple pipette tips can be uniformly clamped onto the various necks.

According to another embodiment, each plunger comprises a plunger rod that is configured to resiliently bend outward. The elastic restoring forces of the plunger-cylinder unit are configured to be generated as a result of bending the relatively thin plunger rod bending.

According to another embodiment, each guide is configured to be moved in the horizontal direction by means of a control mechanism. This makes it possible to set the necks in various positions along the horizontal shaft in a reproducible manner. According to another embodiment, the control mechanism is a manually operable, mechanical control mechanism or an electromechanical control mechanism driven by an electric motor. According to another embodiment, the electromechanical control mechanism is connected to an electronic control apparatus, which can be controlled by the user via buttons, switches and/or another interface.

According to another embodiment, the manually operable, mechanical control mechanism is a scissor lever mechanism having an adjusting wheel, a gear wheel, a toothed slide and a grid or scissor mechanism. As a result, particularly precise adjustment can be achieved with an unchanged vertical orientation of the necks and of the plunger-cylinder apparatuses. For this purpose, according to another embodiment, each guide is suspended at the top and bottom of the grid. In this connection, according to another embodiment, each guide may be suspended on necks projecting from the grid via a hole and a vertical longitudinal slot or via two vertical longitudinal slots According to another embodiment, the multichannel pipetting head comprises 4, 6, 8 or 12 necks or channels. According to another embodiment, the multichannel pipetting head is designed to be provided with pipette tips having a volume selected from the following volumes: 20 μl, 100 μl, 300 μl, 1200 μl.

BRIEF DESCRIPTION OF THE DRAWINGS

The invention will be further explained below with reference to the accompanying drawings of exemplary embodiments. In the drawings.

DETAILED DESCRIPTION OF THE INVENTION

In the present application, the terms "at the top" and "at the bottom" as well as "side" or "lateral (ly)" relate to a multichannel pipetting head which is oriented vertically with the plunger-cylinder units and in which the drive rod is arranged above the necks.

Figure 1:
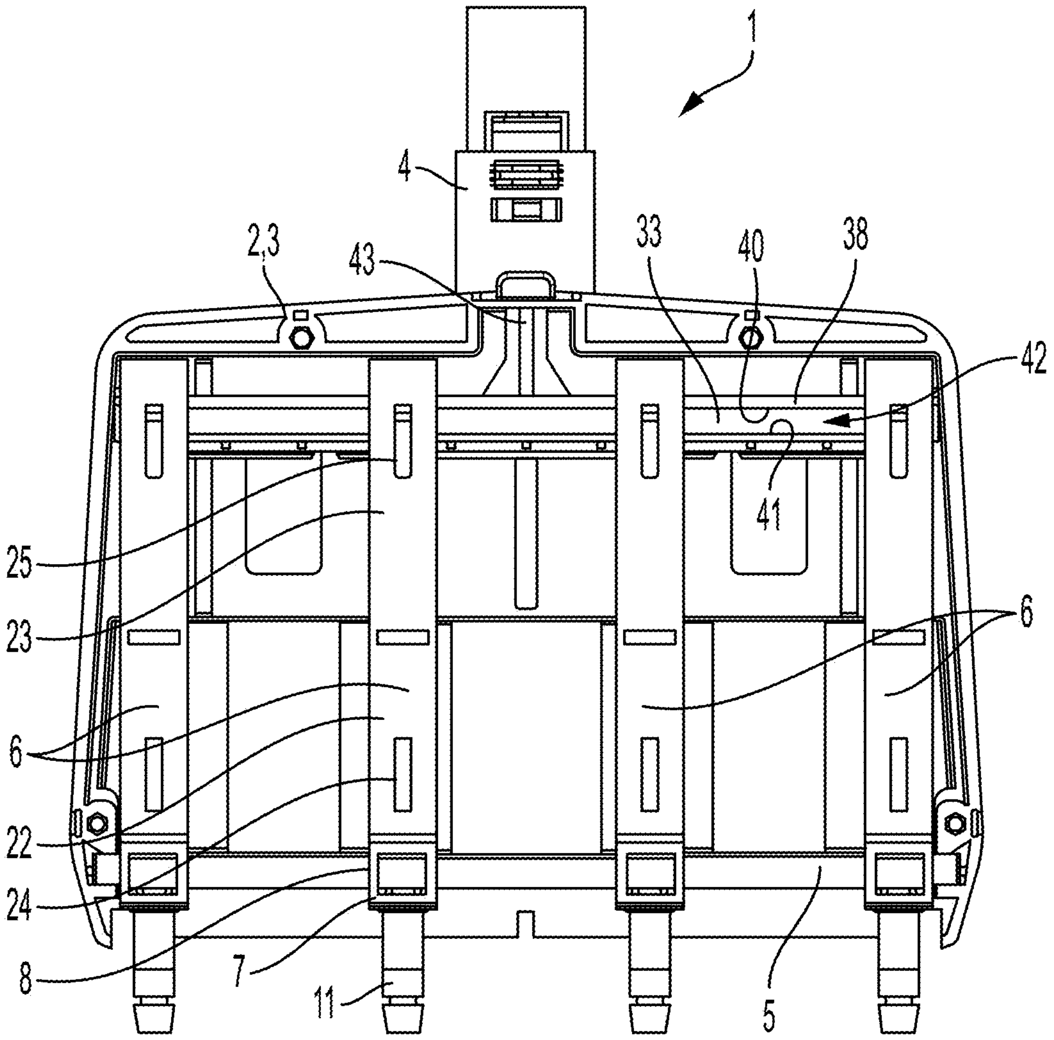
FIG. 1 illustrates a front view of an embodiment of a multichannel pipetting head with the front housing part removed.
Figure 2:
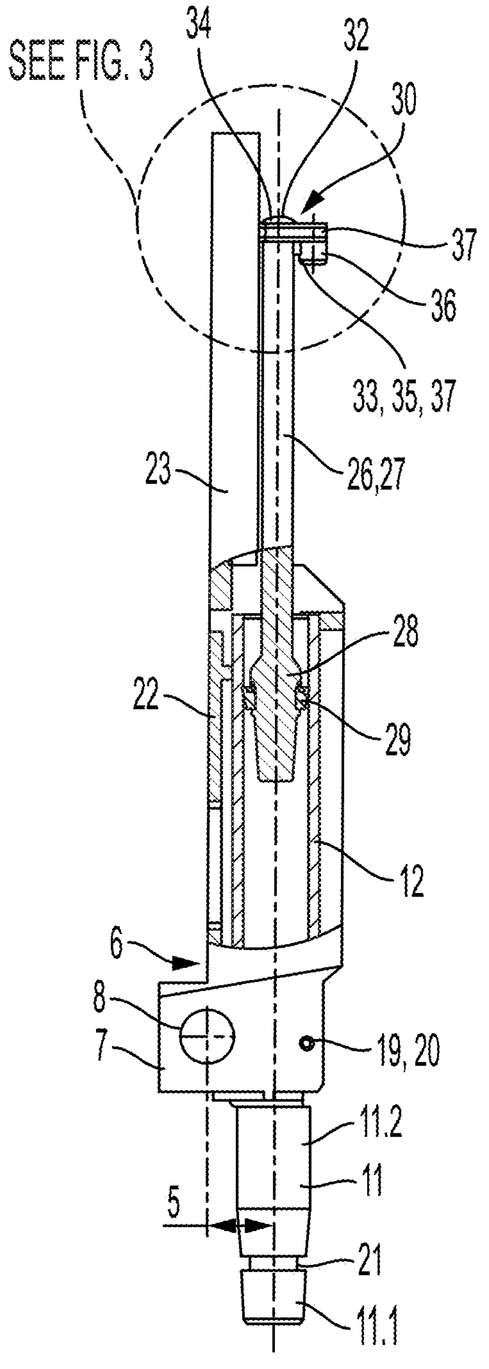
FIG. 2 illustrates a sectional view of an embodiment of a guide with a neck and a plunger-cylinder unit of the multichannel pipetting of FIG. 1.
Figure 3:
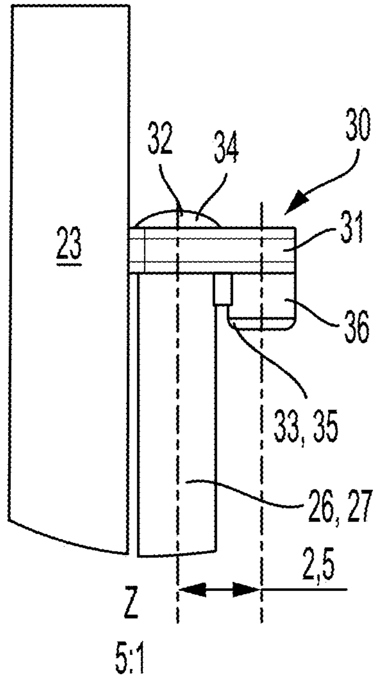
FIG. 3 illustrates an enlarged view of the embodiment of detail III from FIG. 2.

According to FIGS. 1 to 3, the multichannel pipetting head 1 comprises a support structure 2 formed of a two-part housing 3. In FIG. 1, a front housing part has been removed such that only a rear housing part is shown. Alternatively, the support structure may also be formed of a chassis that is clad with a housing.

The housing 3 is substantially box-shaped. A fastening neck 4 for connection to a pipette top part projects vertically upward on the upper edge of the housing 3. A horizontal shaft 5 having a circular cross-section is held in the housing. Multiple guides 6 (in example 4) are held on the shaft 5 so as to be movable in the horizontal direction and pivotable about the shaft 5.

According to FIG. 2, each guide 6 comprises an approximately cuboid bearing portion 7 on the lower end that comprises a horizontal first bearing bore 8. According to FIG. 1, the guide is mounted by means of the first bearing bore 8 on the shaft 5 so as to be movable in the direction of the shaft and pivotable about the shaft 5. According to FIG. 4, the bearing portion 7 comprises a vertical slot 9 which proceeds from the side furthest away from the first bearing bore 8 and ends shortly before the first bearing bore 8. An upper neck portion 10 of a hollow neck 11 for clamping pipette tips is inserted in the slot 9. The neck 11 is connected at the top to a hollow cylinder 12 of a plunger-cylinder unit 13. The hollow space 14 in the neck 11 is connected to the hollow space 16 in the cylinder 12 via a through-hole 15. The inner side of the cylinder 12 forms a running surface for a plunger.

The neck 11 comprises a lower shoulder 17 at the lower end of the upper neck portion 10 and the cylinder 12 comprises an upper shoulder 18 at the upper end of the upper neck portion 10. The lower shoulder 17 adjoins the bottom side of the bearing portion 7 and the upper shoulder 18 adjoins the top side of the bearing portion 7, such that the neck 11 and cylinder 12 are held in the bearing portion 7 so as to be immovable in the vertical direction. The upper neck portion 10 is secured in the slot 9 by means of a pin 19 that is inserted in a horizontal pin bore 20 of the bearing portion 7 that intersects the slot 9. At the bottom, the neck 11 comprises a conical portion 11.1 and above that a cylindrical portion 11.2. The conical portion 11.1 is provided with a circumferential annular groove 21 for inserting a sealing ring.

Figure 4:
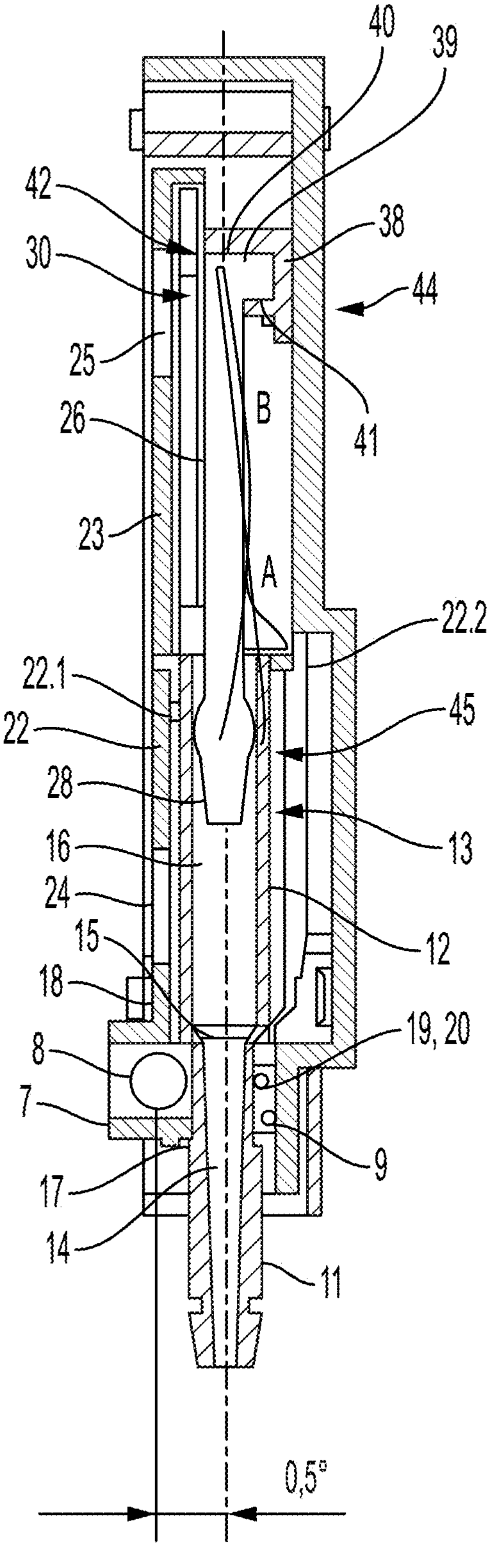
FIG. 4 illustrates a sectional view of an embodiment of the multichannel pipetting head of FIG. 1 through a guide.

According to FIGS. 2 and 4, a sleeve-like guide portion 22 projects vertically upward from the top side of the bearing portion 7. The cylinder 12 is supported on the outside on various sides on first and second contact regions 22.1, 22.2 of the guide portion 22. A holding portion 23 having a flat U-profile projects vertically upward from the sleeve-like guide portion 22 above the first bearing bore 8. According to FIGS. 1 and 4, the guides 6 each comprise a longitudinal slot 24, 25 at the top and at the bottom. The longitudinal slots 24, 25 are used to engage upper and lower bearing bolts of a scissor lever mechanism (grid) for moving the guides 6 relative to one another in the horizontal direction. The guides 6 are preferably manufactured in one piece from plastics material, e.g. by means of injection-molding. The neck 11 and cylinder 12 are manufactured in one piece or in multiple pieces from plastics material (e.g. by means of injection-molding) and/or from metal (e.g. by means of turning).

According to FIGS. 2 and 4, each plunger-cylinder unit 13 comprises a plunger 26, which is pushed into the cylinder 12 from above. The plunger 26 comprises a plunger rod 27 having a thickened plunger portion 28 on the lower end, on which sits a circumferential sealing element 29. The plunger comprises a plunger head 30 on the upper end of the plunger rod 27. The plunger head 30 comprises a planar, e.g. circular disk-shaped portion 31, which has an upper abutment region 32 on the top side and a lower abutment region 33 on the bottom side. The upper abutment region 32 is located on the vertex of a spherical cap 34 on the top side of the circular disk-shaped portion 31. The lower abutment region 33 is located on the lower edge 35 of a cylinder 36 projecting downward next to the plunger rod 27 from the bottom side of the circular disk-shaped portion 31 next to the plunger rod 27. More precisely, the lower abutment region 33 is located on a radius 37 on the lower edge of the cylinder 36. In an embodiment, the plunger 26 is manufactured in one piece from plastics material, preferably by means of injection-molding. The sealing element 29 may also be manufactured in one piece with the plunger 26 or be clamped thereon.

According to FIGS. 1 and 4, the multichannel pipetting head 1 comprises a horizontal plunger actuator 38 arranged next to the holding portions 23 above the cylinder 12. The plunger actuator 38 comprises a horizontal groove 39 on the side opposite the holding portions 23. An upper border 40 of the groove 39 projects further toward the holding portion than a lower border 41. The groove 39 comprises an opening 42 on the side of the holding portions 23. A part of the plunger heads 30 is inserted into the groove 39 through the opening 42, such that the spherical cap 34 adjoins the upper border 40 by means of the upper support region 32 and the cylinder 33 adjoins the lower border 41 by means of the lower support region 33. The holding portion 23 is pivoted against the plunger actuator 38.

A drive rod 43 that protrudes into the fastening cylinder 4 projects upward from the top side of the plunger actuator 38. The plunger actuator 38 and the drive rod 43 are preferably manufactured in one piece from plastics material, preferably by means of injection-molding.

The fastening cylinder 4 is configured to be connected to a pipette top part via a snap connection and the upper end of the drive rod 43 can be connected to a drive apparatus in the pipette top part for vertically moving the drive rod 43 via a clamp connection. The plunger head 30 and the groove 39 are dimensioned such that the plunger head 30 would form an interference fit with the groove 39 at the upper and lower abutment point 32 and lower abutment area 33 if the plunger-cylinder units. 13 were rigid and not elastically deformable. In particular, the plunger rod 27 and the sealing element 29 of the plunger-cylinder units 13 are designed to be resilient, such that the plunger heads 30 can tilt in the groove 39 under the elastic deformation of the plunger-cylinder units 13.

When the plunger head 30 and plunger actuator 38 are joined, the fact of the plunger head 30 being oversized relative to the groove 39 causes the plunger head 30 to be inclined with respect to the vertical (e.g. by) 0.5°. In this position, the plunger 26 can be easily moved in the axial direction in the plunger actuator 38 by means of the plunger head 30. The preload in the plunger-cylinder unit 13 generated by the inclination of the plunger head 30 holds the plunger head 30 in the tilted position. The guide 6 and the cylinder 12 cannot follow the inclination A (cf. FIG. 4) of the plunger head 30, since the guide 7 strikes the plunger actuator 38 and thus blocks inward rotation. Since the plunger 26 comprises a lower support point on the sealing element in the cylinder 12 in addition to the upper support point 44 in the plunger actuator 38. It is deformed in the manner of a flexible spring B (cf. FIG. 4). As a result, a counterforce is generated which causes the plunger 26 to rest against the upper abutment point 32 and the lower abutment area 33 in the plunger actuator 38 in a clearance-free manner at all times and prevents play of the plunger head 26 in the groove 39.

Figure 5:
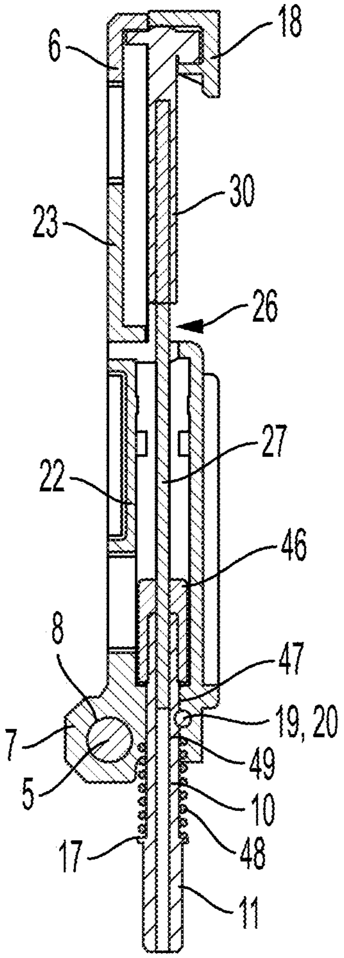
FIG. 5 illustrates a sectional view of an embodiment of a guide with neck and plunger-cylinder unit and plunger actuator of another embodiment of a multichannel pipetting head.
Figure 6:
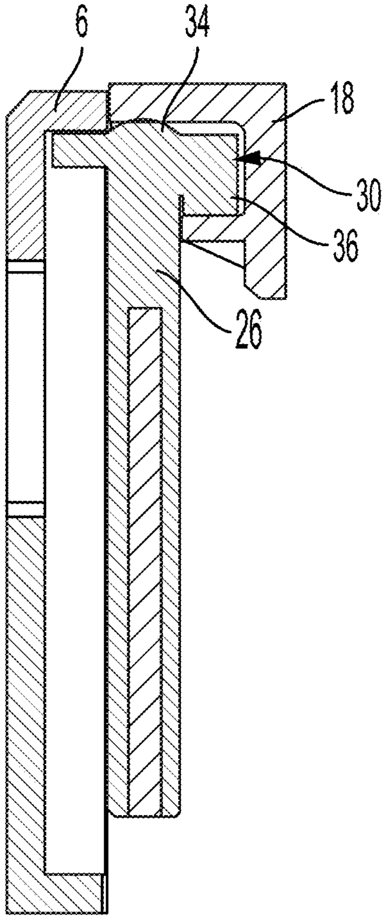
FIG. 6 illustrates an enlarged view of detail VI FIG. 5.

The embodiment shown in FIGS. 5 and 6 differs from that described above in that the lower plunger portion is the lower end of the plunger rod 27. Furthermore, the plunger 26 is not sealed off by means of a sealing element in a plunger running path of the cylinder 12, but rather by means of hat-leather packing 46, which is clamped onto the upper end of the cylinder 12 and rests on the outer side of the plunger rod 27 outside the cylinder 12. The plunger head 30 rests on the upper end of the plunger rod 27.

In this embodiment, the plunger rod 27 is preferably formed by a steel needle and the plunger head 30 is molded from plastics material onto the upper end of the steel needle. The counterforce for holding the plunger head in abutment with the groove 39 is generated by the elastic deformation of the hat-leather packing 46 and the steel needle. Furthermore, the neck 11 is held in a vertical second bearing bore 47 in the bearing portion 7 of the guide 6. The neck 11 is supported on the bearing portion 7 of the guide 6 via a compression spring 48. The compression spring 48 is guided on an upper neck portion 10 and supported at the bottom on a lower shoulder 17 of the upper neck portion 10 and at the top on the bottom side of the bearing portion 7. Further up, the upper neck portion 10 has a tangentially flattened portion 49 on the circumference for engagement of a pin 19 inserted into a horizontal pin bore 20 of the bearing portion 7. As a result, the neck 11 and the cylinder 12 integrally connected thereto is secured on the bearing portion 7 and the vertical movement of the neck 11 in the bearing portion 7 is limited.

On account of the necks 7 being held on the guides 6 in a spring-loaded manner, the pipette tips are clamped on the various necks 7 at substantially equal heights.

The invention claimed is:

1. A multichannel pipetting head comprising:
- a horizontal plunger actuator comprising at least one groove, the at least one groove comprising an upper border, a lower border, and defining a side opening;
- a drive rod configured to move the horizontal plunger actuator in a vertical direction;
- a plurality of plunger-cylinder units, wherein each plunger-cylinder unit comprises,
  - a hollow cylinder, and
  - a plunger comprising a plunger head, the plunger head comprising,
    - a projecting upper abutment region adjoining the upper border of the horizontal plunger actuator;
    - a projecting lower abutment region adjoining the lower border of the horizontal plunger actuator and laterally offset relative to the projecting upper abutment region, wherein the plunger is configured to engage the hollow cylinder and is sealed off from the hollow cylinder and wherein the plunger head engages the groove through the opening; and
- a plurality of guides configured to be shifted along a horizontal shaft, wherein each of the hollow cylinders is coupled to a neck and is held on each of the plurality of guides, wherein during a lateral movement of the plurality of guides along the horizontal shaft, the plunger head is configured to tilt in the groove and is configured to be held with the upper abutment region abutting the upper border and with the lower abutment region abutting the lower border of the groove due to restoring forces that occur during tilting in the plunger-cylinder units.

2. The multichannel pipetting head according to claim 1, wherein when the plunger-cylinder unit is comprised of a rigid material, the plunger head and the groove are configured to form an interference fit.

3. The multichannel pipetting head according to claim 1, wherein at least one of: (1) the projecting upper abutment region of the plunger head is an upper abutment point on a top side; and (2) the projecting lower abutment region is a lower abutment area on a bottom side.

4. The multichannel pipetting head according to claim 3, wherein at least one of: (1) the upper abutment point is positioned on a spherical cap on the top side; and (2) the lower abutment area is positioned on a lower edge of a downwardly pointing cylinder.

5. The multichannel pipetting head according to claim 1, wherein the plurality of guides are rotatably mounted on the horizontal shaft.

6. The multichannel pipetting head according to claim 3, wherein lower abutment areas are laterally offset further from the horizontal shaft than the upper abutment points.

7. The multichannel pipetting head according to claim 1, wherein the upper border is opposite the lower border that projects further in a horizontal direction from one side, wherein the one side defines the opening.

8. The multichannel pipetting head according to claim 1, comprising a resilient packing clamped to a top of each cylinder through which a plunger rod connected to the plunger is guided in an upwardly sealing manner.

9. The multichannel pipetting head according to claim 1, wherein each plunger comprises a circumferential resilient sealing element positioned on an outer circumference and configured to seal a plunger running surface on an inner side of the hollow cylinder.

10. The multichannel pipetting head according to claim 1, wherein each neck is supported on the plurality of guides via a compression spring, wherein each neck is configured to be moved upward relative to the plurality of guides counter to the compression spring.

11. The multichannel pipetting head according to claim 1, wherein each plunger comprises a plunger rod configured to resiliently bend outward.

12. The multichannel pipetting head according to claim 1, wherein each of the plurality of guides is configured to be moved in a horizontal direction using a control mechanism.

* * * * *